(12) United States Patent
Diot et al.

(10) Patent No.: US 6,184,486 B1
(45) Date of Patent: *Feb. 6, 2001

(54) ROTATIVE TOOL-ELECTRODES OF SIMPLE SHAPES FOR 3D ELECTROEROSIVE MACHINING

(75) Inventors: Jean-Claude Diot, Douvaine; Willi Zaugg, Echenevez; Gérald Naville, Scentrier; Jean-Paul Briffod, Lucinges, all of (FR)

(73) Assignee: Charmilles Technologies S.A., Meyrin (CH)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/963,477

(22) Filed: Nov. 3, 1997

Related U.S. Application Data

(63) Continuation of application No. 08/653,811, filed on May 28, 1996, now abandoned, which is a continuation of application No. 08/293,018, filed on Aug. 19, 1994, now abandoned.

(30) Foreign Application Priority Data

Aug. 19, 1993 (CH) .................................................. 470/93

(51) Int. Cl.$^7$ .................................................. B23H 7/30
(52) U.S. Cl. ................. 219/69.2; 219/69.16; 219/69.17; 219/69.13
(58) Field of Search .............................. 219/69.2, 69.16, 219/69.17, 69.13, 69.15

(56) References Cited

U.S. PATENT DOCUMENTS

| 2,818,491 | 12/1957 | Matulaitis ............................... 219/69 |
| 3,591,761 | 7/1971 | Bederman et al. ..................... 219/69 |
| 4,168,426 | * 9/1979 | Furakawa ............................. 219/69.2 |
| 4,608,476 | * 8/1986 | Shimizu ............................. 219/69.17 |
| 5,354,961 | * 10/1994 | Diot et al. .......................... 219/69.13 |

FOREIGN PATENT DOCUMENTS

| 555 818 B1 | 12/1995 | (EP) . |
| 2 211 775 | 7/1989 | (GB) . |
| 62-297019 | 12/1987 | (JP) . |
| 1228986 A1 | 5/1986 | (RU) . |
| 1662781 A1 | 7/1991 | (RU) . |
| 1703315 A1 | 1/1992 | (RU) . |

OTHER PUBLICATIONS

M. Tsuchiya et al., "Three Dimensionally Controlled EDM Using Column Shaped Electrode", J. Japan Soc. Electrical Machining Eng., 1983, vol. 17, No. 34, pp. 30–42.

T. Kaneko et al., "Numerically Controlled Contouring By Electric Discharge Machining With Compensation For The Deformation Of Cylindrical Tool Electrodes", Precision Engineering, Jul. 1988, vol. 10, No. 3, pp. 157–162.

* cited by examiner

Primary Examiner—Karl D. Easthom
(74) Attorney, Agent, or Firm—Burns, Doane, Swecker & Mathis, L.L.P.

(57) ABSTRACT

Electrode tools for electroerosion (EDM) where a cavity or a relief is machined by hollowing out the part at great speed and in successive layers or slices by means of a rotating electrode tool of a simple shape which is independent of the cavity to be eroded, called "EDM slices milling".

5 Claims, 3 Drawing Sheets

ROTATIVE TOOL-ELECTRODES OF SIMPLE SHAPES FOR 3D ELECTROEROSIVE MACHINING

This is a continuation of application(s) Ser. No. 08/653,811 filed on May 28, 1996, now abandoned, which is a continuation of, U.S. Ser. No. 08/293,018, filed on Aug. 19, 1994, now abandoned.

BACKGROUND OF THE INVENTION

1. Field of the Invention

The present invention deals with electrode tools for electroerosion (EDM) where a cavity or a relief is machined by hollowing out the part at great speed and in successive layers or slices (i.e. if "peelpocketting") by means of a rotating electrode tool of a simple shape which is independent of the cavity to be eroded, called "EDM slices milling". The fastidious designing and manufacturing of electrodes of complex shapes is thus avoided, thanks to an automatic breakdown of the geometry and to a machining simulation.

2. Background Information

This EDM slice milling method with wear compensation has already been described in the European patent application EP 555818 filed by the applicant. It concerns machining at a high wear rate where the length of a simply shaped electrode tool decreases rapidly, but without any apparent lateral wear. The longitudinal wear of the electrode tool is compensated by a regular, coaxial additional advance, directed of course towards the workpiece and corresponding to a theoretical value of that wear. The value of this advance is deduced by calculation based on technological preexisting data and on the geometry of the electrode tool, in such a way so as to keep the active end of the electrode tool parallel to the plane of the slice to be hollowed out. Moreover, the geometry of the three-dimensional volume to be hollowed out has been memorized as a superposition of virtually parallel slices (or layers). The active end of the electrode tool makes to and fro movements, or snaking movements or other sweeping movements, in the plane of each of these slices so as to erode them successively down to the bottom of the cavity to be machined.

Since EDM slices milling is a machining method with a high wear rate, the applicant has chosen, at a first stage, to use solid electrodes, in particular cylindrical ones, rather than hollow tubes. This choice corresponds to the most recent state of the art, that is to say the work done by M. M. Tsuchiya, T. Kaneko and S.Shoda (in particular "Three-dimensionally controlled EDM Using Column-Shaped Electrodes; J. Japan soc. Electrical Machining Eng. 1983, 17 (34), 30 42").

Tubular electrodes, at first sight, have as many drawbacks as advantages. As a matter of fact, it did not really seem appropriate to use a tubular tool which gets worn out much faster than a solid one in spite of its known advantage offering the possibility of tracing grooves with a flat bottom. Indeed, as stated in Applicant's EP 555818, after a short transitional phase, the active end of the electrode tool takes an invariable profile called an "asymptotic or stationary shape". As illustrated in FIG. 1, the stationary shape of the tool tip 100 in the case of a rotating hollow tube 120 is a truncated cone 130. Using the tool tip 100, it is possible to trace adjacent grooves 140 with a flat bottoms 150. This facilitates erosion of successive flat slices, each being of a constant thickness, E wherein the thickness of the wall of the electrode is τ. The other known advantage of using tubular electrode tools in EDM machining is when a good irrigation of the machining gap is necessary by injecting or aspiring the dielectric through the hollow tube. In the case of EDM slices, such milling is only of little use, since the cavity to be machined is much larger than the tool.

The applicant has discovered quite unexpectedly that, thanks to the use of tubular electrodes, computer aided preparation of machining of EDM slices milling, as described in applicant's parallel application filed concurrently herewith (Attorney Docket No. 032530-007 (U.S. Ser. No. 08/780,127), having priority on Application No. 02 484/93-9 filed Aug. 20, 1993 in Switzerland), becomes possible. Such preparation, (e.g., of the programming of the plane paths at zero wear of the tool for each slice, the wear compensation, or the simulation of machining by calculating the material removal and by programming the machining speeds along these plane paths) seemed utopian and hardly implementable in view of the complexity subsequent to the accumulation of all of the differences between reality and the ideal universe of simulation. The tubular electrodes thus do not only possess as the sole advantage that of machining flat bottoms. Tubular electrodes have also made it possible to formulate, without any risk for the geometry of the finished part, simplified hypotheses to program computer aided preparation of EDM slices milling, and to envisage the calculation of theoretical material removal and machining speed at each point of the plane paths at zero wear.

SUMMARY OF THE INVENTION

The objective of the present invention is therefore an electrode tool for EDM slices milling made up of an electricity conducting tube that is hollow or at least partly filled with a material which wears faster than the tube itself. In the latter case of the composite electrodes, the stationary shape is the same as that of the hollow tube, for example the trunk of a cone for cylindrical tubes. Being used by rotating, instead of being cylindrical, the tube may have a square cross section or any other polygonal section.

Another objective of the present intervention is the utilization of such an electrode tool on an EDM slices milling machine. It is moreover advantageous to use an electrode tool the geometry of which is adapted to its utilization for EDM slices milling, because said geometry is suited to the computer aided preparation method of this kind of EDM machining.

A tube with a any sized inner or outer diameter, or a wall with any thickness, will not necessarily be adequate for EDM slices milling. The choice of the correct inner or outer diameter and of the correct thickness is moreover a matter of compromise. For a given outer diameter it is advisable to choose the least possible thickness to obtain as large a groove as possible, provided the mechanical stability of the tool is preserved. But the thinner the wall, the faster the tool wears out. In general, it is preferable that the ratio between the thickness of the wall and the inner diameter is situated between $1/10$ and $1/3$, but this depends on the material of which the tube is made.

It is furthermore advantageous to standardize the sizes of the tubes envisaged to serve as electrodes for EDM slices milling, in order to avoid the directional changes of its path. Since the tool follows a sweep path, these directional changes will occur rather frequently.

Lastly, the known wear compensator does not permit to really "simulate" the machining, because it does not provide any means to evaluate the variation of the material cut and to deduce therefrom the machining speed according to the curved abscissa.

Accordingly, the objective of the present invention is therefore to elaborate a method to prepare machining by EDM milling which would effectively simulate the machining by taking into account the theoretical material removal and the machining speed corresponding to each point of the path and which would take into account the various factors affecting the actual wear of the electrode tool, but without modifying the principle of the existing wear compensation module., There is, therefore, no need to have recourse to a continuous adaptation of the additional advance in response to a continuous control of longitudinal wear of the tip.

Another additional objective was to introduce into this machining preparation, a strategy anticipating the direction changes of the path so as to prevent the tool from overshooting caused by inertias and the response time of the EDM system.

BRIEF DESCRIPTION OF THE DRAWINGS

The foregoing and other objects, features and advantages of the present invention will be more readily understood upon reading the following detailed description in conjunction with the drawings in which.

DETAILED DESCRIPTION

Figure 2:
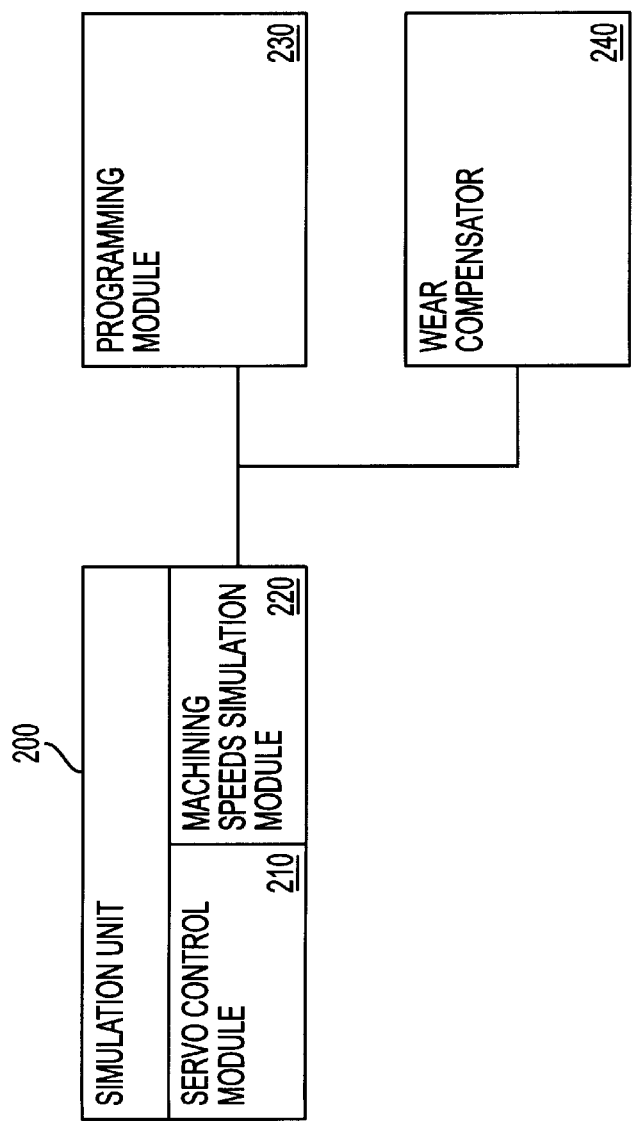
FIG. 2 illustrates a block diagram of a simulation unit in accordance with an exemplary embodiment of the present invention.

The simulation unit 200, as illustrated in FIG. 2, according to the present invention comprises a known servo control module 210 and a known machining speeds simulation module 220 modified in accordance with the present invention to approximate the shape of an electrode tool configured in accordance with the present invention (e.g., the tool can be approximated as a cylinder rather than a truncated cone).

As described in EP 555818, the 3D shape of the piece to be machined is broken down by means of a programming module 230 into superpositioned zero wear plane tool paths, preferably programmed in the form of straight segments. This module is capable of recognizing cavities and islands, of finishing with smaller electrodes and automatically creating machining files for each slice. The files are transferred to a known wear compensator 240 programming an additional advance of the tool and to the machining speeds simulation module 220 which has been modified in accordance with the present invention. The simulation unit 200 is associated with the known wear compensation module 240 which produces a real simulation of machining by calculating the theoretical zero wear material removal and the machining speed at each point of the zero wear tool path. Furthermore, by means of the real time servo control module 210, the theoretical value of the wear compensation can be corrected.

The present invention is described by taking, as an example, tubular electrodes as they possess numerous advantages, in particular to permit the machining of flat bottoms. Tubular electrodes' use in EDM slice milling is also the object of a parallel patent application filed concurrently herewith (U.S. Ser. No. 08/780,127, Attorney Docket No. CMS-237-A/01), having priority on Application No. 02 484193-9 filed Aug. 20, 1993 in Switzerland). Other tool forms with a rotational symmetry can also be envisaged, like solid cylinders or even such with a hemispherical end. One would preferably use cylindrical tubes, which usually have a diameter of 0.5 to 20 mm. Smaller diameters may cause a problem because they lack rigidity and, the machining force may cause them to buckle and leave marks on the piece.

Figure 1:
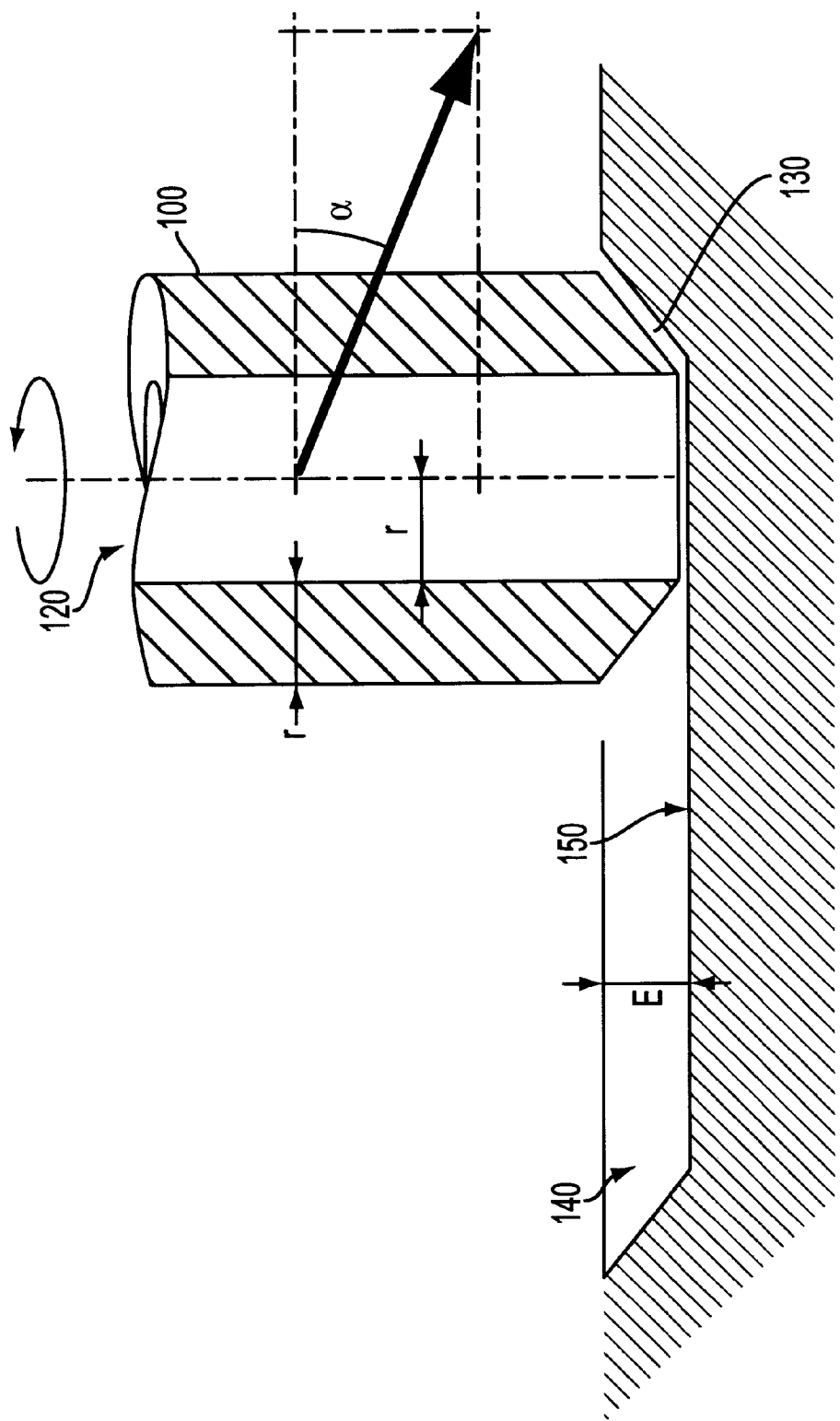
FIG. 1 illustrates a tool tip used in EDM slices milling.
Figure 3:
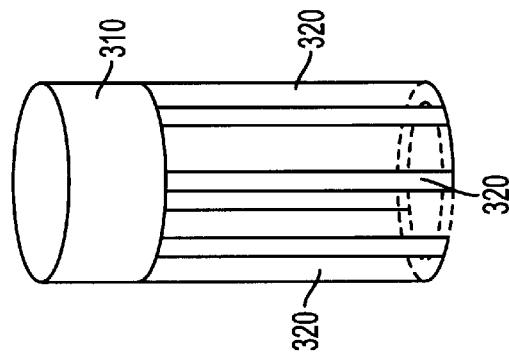
FIG. 3 illustrates a tool tip used in EDM milling in accordance with an exemplary embodiment of the present invention.

The expression "tube" covers also an electrode made up of several elements which form a tube when they are rotated. An example of such a "partial" tube 300 is illustrated in FIG. 3. Only one of the ends 310 of the tool is tubular and has several blades 320 that are parallel to its central axis and which are mounted on its periphery.

Figure 4A:
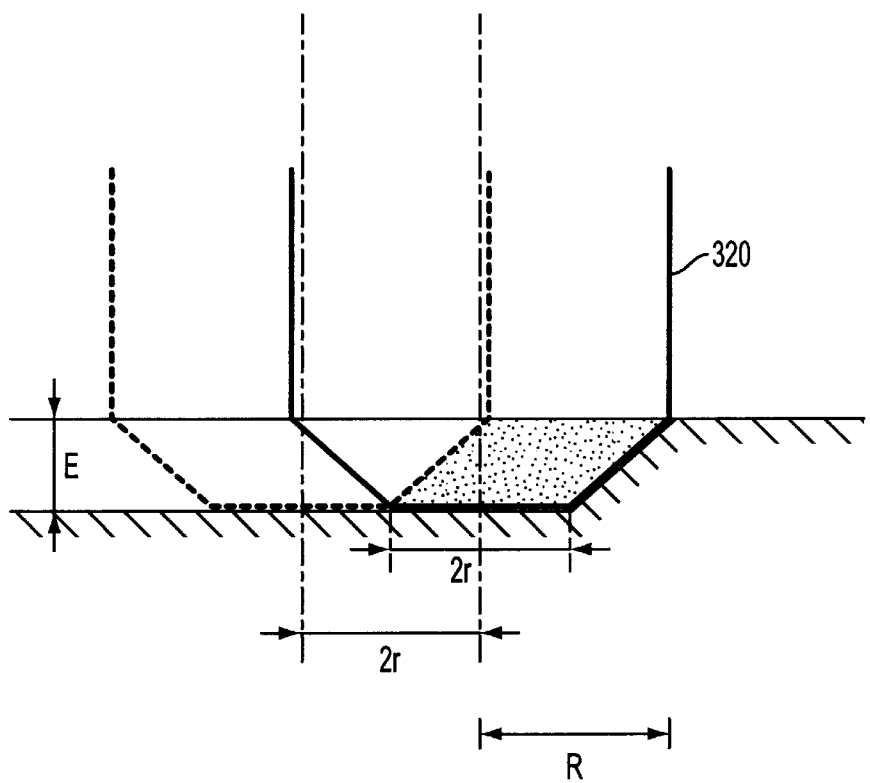
FIGS. 4A and 4B illustrate a simulation of the tool tip for EDM slices milling in accordance with an exemplary embodiment of the present invention.
Figure 4B:
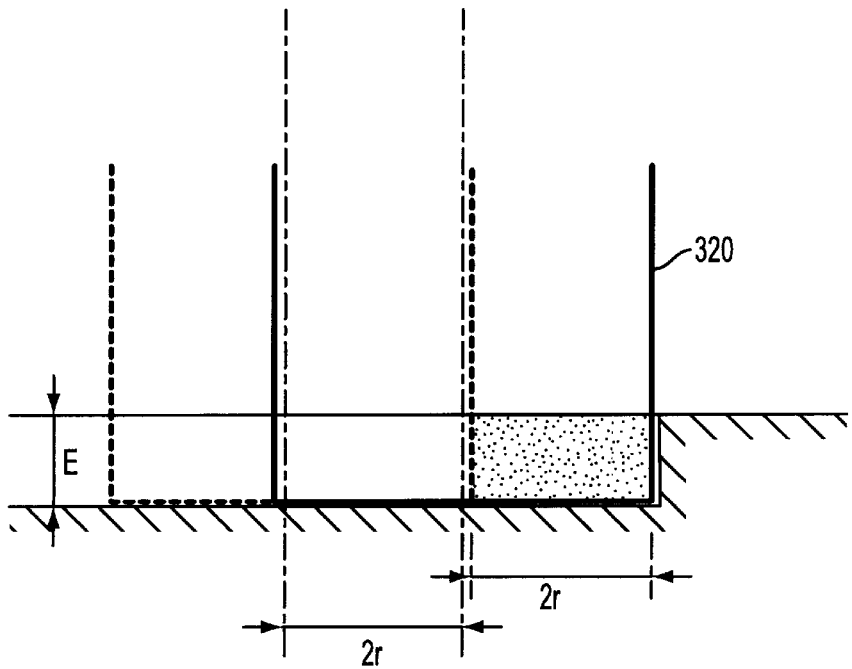

As already pointed out, the stationary position of the active end of a tubular electrode is truncated in a first approximation. In reality one obtains a more or less accentuated parabolic form. The applicant has found that it is possible to simplify the programming of the plane paths by surprisingly no more taking into account the actual shape of the active end, and yet obtain satisfactory results. For example, if the tool is a tube with an outer radius R and an inner radius r, then instead of perceiving the tool in the form of a truncated cone, illustrated in FIG. 4a, whose interior base is a circle with a diameter 2r and the upper section a circle with a diameter 2R, the programmer perceives the shape in the form of a cylinder having a radius r, illustrated in FIG. 4b or the radius is increased by a machining gap (discussed below).

The thickness and inclination of the slices can either be the same for the entire volume to be broken down or vary based upon certain criteria. In particular, with regard to the shape to be eroded and the accuracy and quality of the desired surface, the thinner the slice, the smaller the difference between the theoretical cylinder and the actual shape of the tool. Accordingly, the simulation is more accurate. Lastly, since the transitional phases only last the time required for the tool to wear itself down by one slice thickness, it is advantageous to work with thin slices. However, thick slices permit machining at a powerful setting and the use of electrodes with a large diameter where the thickness of the slice depends on the diameter and the thickness of the wall of the tube. The slice thickness, E, is generally on the maximum equal to the thickness of the wall of the tube and on the minimum equal to the machining gap. The programmer will therefore have to work out a good compromise and not multiply, without good reason, the number of slices which lengthens machining time. When one uses powerful settings, the slices may have a thickness of several mm; for finishing, the slices are subdivided into finer ones (a few hundredth of a mm for fine settings). This makes it possible to eliminate steps formed on the borders of the eroded slices during roughing and which are marked the more, the thicker the roughing layers.

The sweeping mode is generally selected according to the shape of the piece and of each of the slices. It may vary from one slice to the other so as to avoid adding up the same error from one slice to the next. A judicious choice of the sweeping mode permits minimizing the errors due to the differences between reality and simulation and to maintain as much as possible a constant lateral cut and reduce the transitional phases.

We wish also to point out that the sweeping step may be different from the interior diameter of the tool, and that it may be advantageous to increase this step to reduce thus the length of the trajectory cut out by the tool.

What is claimed is:

1. A method for use of an electrode-tool on a machine for EDM slices milling, wherein said machine is programmed in such a manner that a tip of said electrode tool moves parallel to a plane of a slice of material of a workpiece to be eroded, comprising the steps of:

simulating a variation of material removal and machining speed along programmed tool paths, by representing a non-cylindrically shaped tip of said electrode tool as having a cylindrical shape; and removing material by machining adjacent grooves in said slice of material of said workpiece, according to a sweeping motion.

2. The method of claim 1, wherein said step of simulating further comprise the step of:

virtually cutting out geometry of the workpiece as a superposition of parallel slices, wherein a thickness of adjacent grooves in said slices is equal to or less than that of the wall of the electrode tool.

3. The method of claim 1 wherein said cylindrical shape has a radius equal to an outer radius of the electrode tool or to the outer radius of the electrode tool increased by a machining gap.

4. The method of claim 1, further comprising the step of:

advancing the tip of said electrode tool, for each groove, an amount equal to an inner diameter of the tip of the electrode tool.

5. The method of claim 4, said step of simulating further comprises the step of:

programming an additional advance of the electrode tool in a desired direction which is inversely proportional to the thickness of its wall.

* * * * *